US010222679B2

(12) United States Patent
Wakamatsu

(10) Patent No.: US 10,222,679 B2
(45) Date of Patent: Mar. 5, 2019

(54) SHAKE CORRECTION DEVICE, IMAGE PICKUP APPARATUS, AND SHAKE CORRECTION METHOD

(71) Applicant: CANON KABUSHIKI KAISHA, Tokyo (JP)

(72) Inventor: Nobushige Wakamatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/571,106

(22) PCT Filed: May 10, 2016

(86) PCT No.: PCT/JP2016/002294
§ 371 (c)(1),
(2) Date: Nov. 1, 2017

(87) PCT Pub. No.: WO2016/194307
PCT Pub. Date: Dec. 8, 2016

(65) Prior Publication Data
US 2018/0173079 A1 Jun. 21, 2018

(30) Foreign Application Priority Data
May 29, 2015 (JP) .................................. 2015-109363

(51) Int. Cl.
G03B 5/00 (2006.01)
H04N 5/232 (2006.01)
G02B 27/64 (2006.01)

(52) U.S. Cl.
CPC ............. G03B 5/00 (2013.01); G02B 27/646 (2013.01); H04N 5/232 (2013.01);
(Continued)

(58) Field of Classification Search
CPC ....................................................... G03B 5/00
(Continued)

(56) References Cited

U.S. PATENT DOCUMENTS 5,649,237 A 7/1997 Okazaki
5,978,600 A * 11/1999 Takeuchi ............. G02B 27/646
396/53

(Continued)

FOREIGN PATENT DOCUMENTS

JP 07-225405 A 8/1995
JP 2007-288726 A 11/2007
(Continued)

OTHER PUBLICATIONS

Tsuchiya Hitoshi, WO2014020924 Shake Amount Detection Device, Imaging Device and Shake Amount Detection Method, Olympus Corp., Feb. 2014, 53 pages.*

(Continued)

Primary Examiner — Clayton E Laballe
Assistant Examiner — Kevin Butler
(74) Attorney, Agent, or Firm — Cowan, Liebowitz & Latman, P.C.

(57) ABSTRACT

An image pickup apparatus is provided with a shake correction unit that corrects image shake of an image that can arise from shake such as camera shake and a driver thereof. An angular velocimeter detects an angular velocity of shake, and an accelerometer detects acceleration of the shake. A CPU acquires an angular velocity detection signal and an acceleration detection signal, and then computes a first parallel shake amount that is shake in the direction orthogonal to the optical axis of an imaging optical system. A velocity computation unit computes a second parallel shake amount by combining the acceleration detection signal and the first parallel shake amount. The driver drives the shake correction unit based on the second parallel shake amount to correct shake.

15 Claims, 10 Drawing Sheets

(52) U.S. Cl.
CPC ..... *H04N 5/23258* (2013.01); *H04N 5/23287* (2013.01); *G03B 2205/0007* (2013.01); *G03B 2205/0015* (2013.01); *G03B 2217/005* (2013.01)

(58) Field of Classification Search
USPC .......................................................... 396/55
See application file for complete search history.

(56) References Cited

U.S. PATENT DOCUMENTS

| | | | |
|---|---|---|---|
| 8,305,455 B2 | 11/2012 | Washisu et al. | |
| 8,736,690 B2 | 5/2014 | Imanishi | |
| 9,131,156 B2* | 9/2015 | Tsuchiya | G02B 27/646 |
| 9,525,820 B2 | 12/2016 | Tanaka et al. | |
| 2012/0033954 A1* | 2/2012 | Wakamatsu | G02B 27/646 |
| | | | 396/55 |
| 2012/0093493 A1* | 4/2012 | Wakamatsu | G02B 27/646 |
| | | | 396/55 |
| 2013/0162847 A1 | 6/2013 | Miyazawa | |
| 2013/0163084 A1 | 6/2013 | Miyazawa | |
| 2014/0085494 A1 | 3/2014 | Tsuchiya et al. | |
| 2014/0327789 A1 | 11/2014 | Tsuchiya et al. | |

FOREIGN PATENT DOCUMENTS

| | | | | |
|---|---|---|---|---|
| JP | 2007288726 | * | 11/2007 | ............... G03B 5/00 |
| JP | 2009-118135 A | | 5/2009 | |
| JP | 2009118135 | * | 5/2009 | ............. G03B 15/00 |
| JP | 2010-025962 A | | 2/2010 | |
| JP | 2010-096938 A | | 4/2010 | |
| JP | 2014-041230 A | | 3/2014 | |
| WO | 2014/020924 A1 | | 2/2014 | |
| WO | 2014/132827 A1 | | 9/2014 | |

OTHER PUBLICATIONS

Search Report of International Application No. PCT/JP2016/002294 dated Aug. 9, 2016.

* cited by examiner

[Fig. 1]
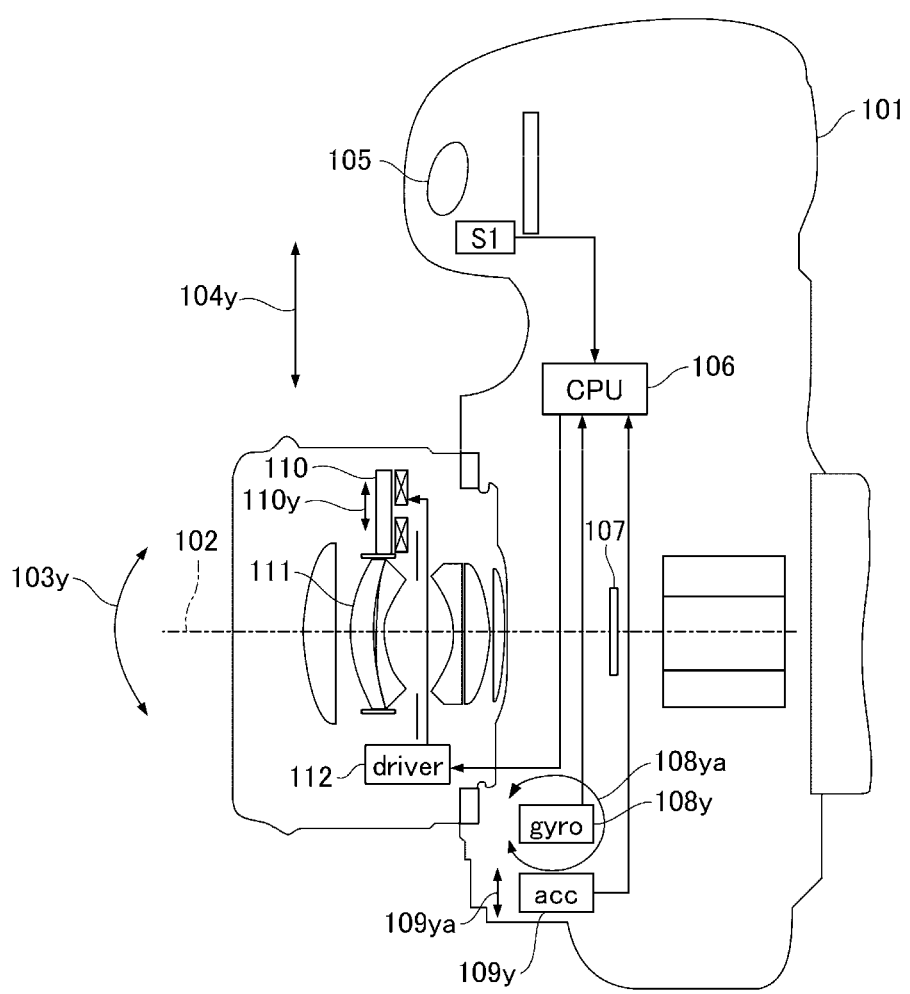

[Fig. 2]
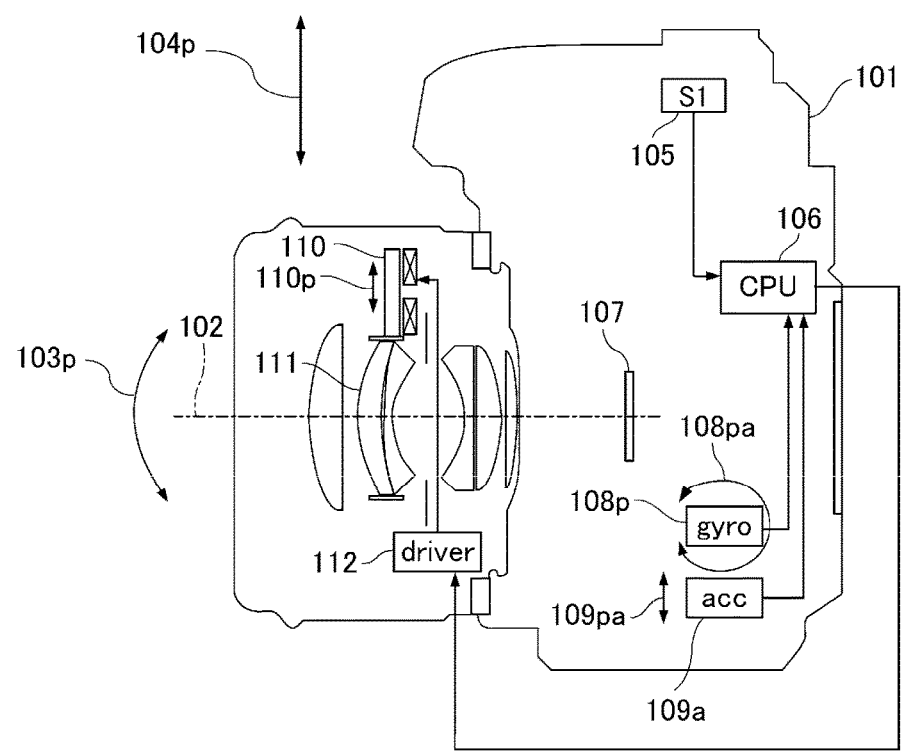

[Fig. 3]
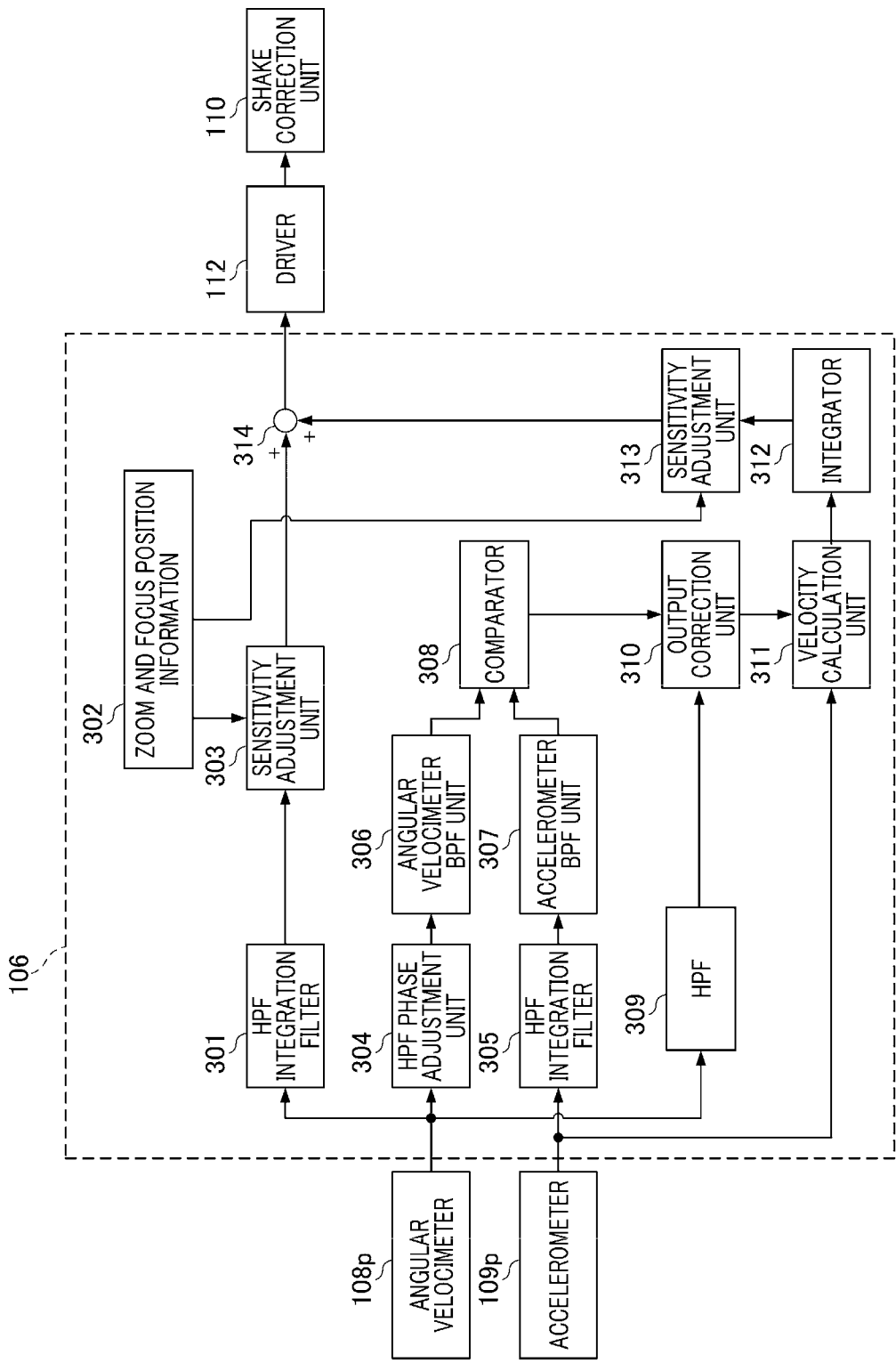

[Fig. 4]
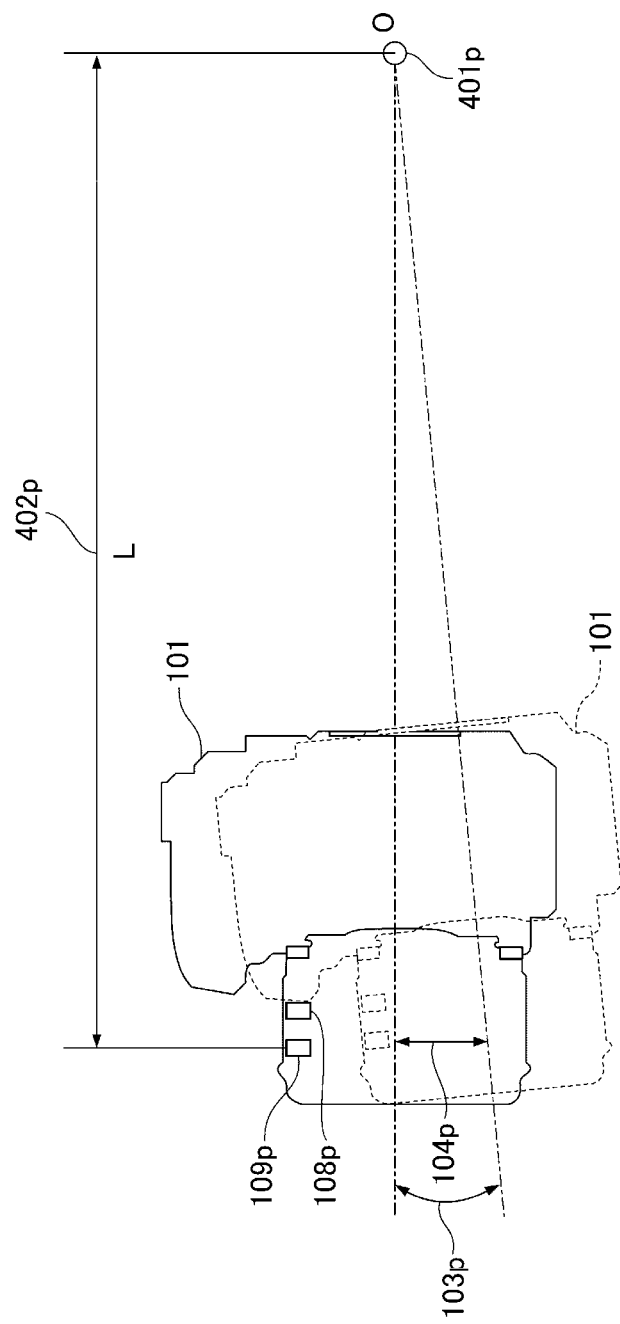

[Fig. 5A]
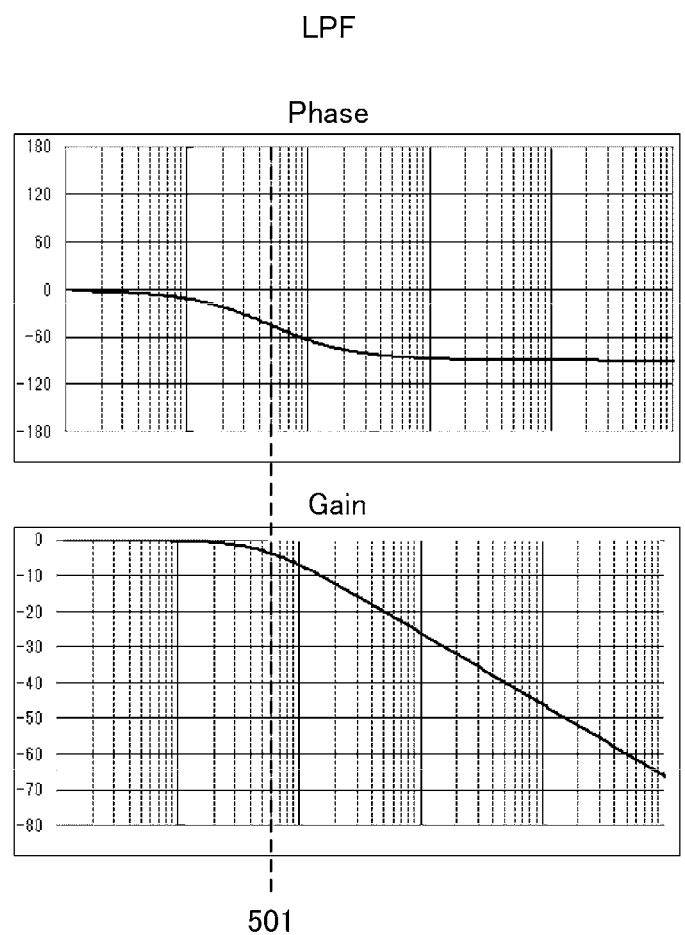

[Fig. 5B]
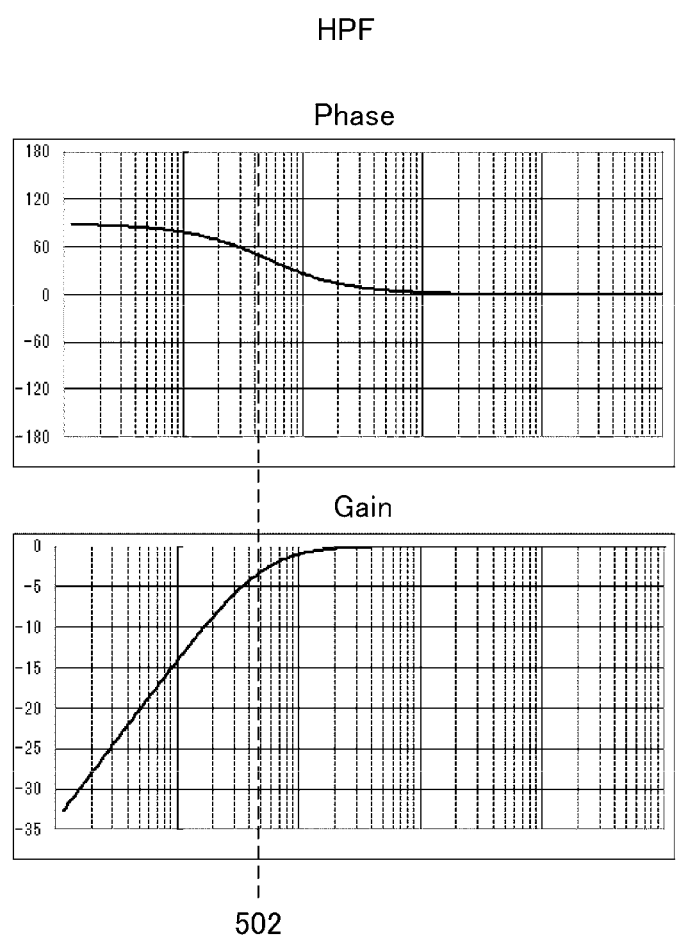

[Fig. 6]
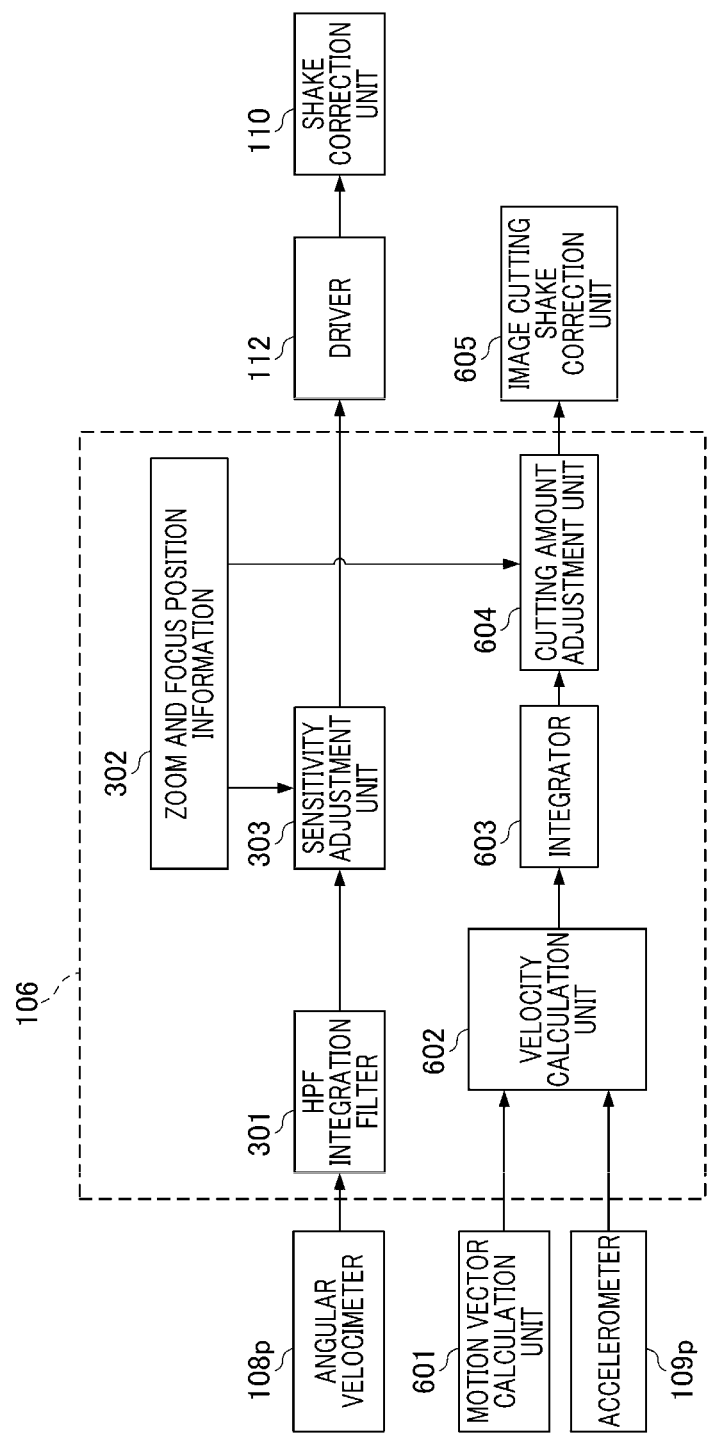

[Fig. 7]
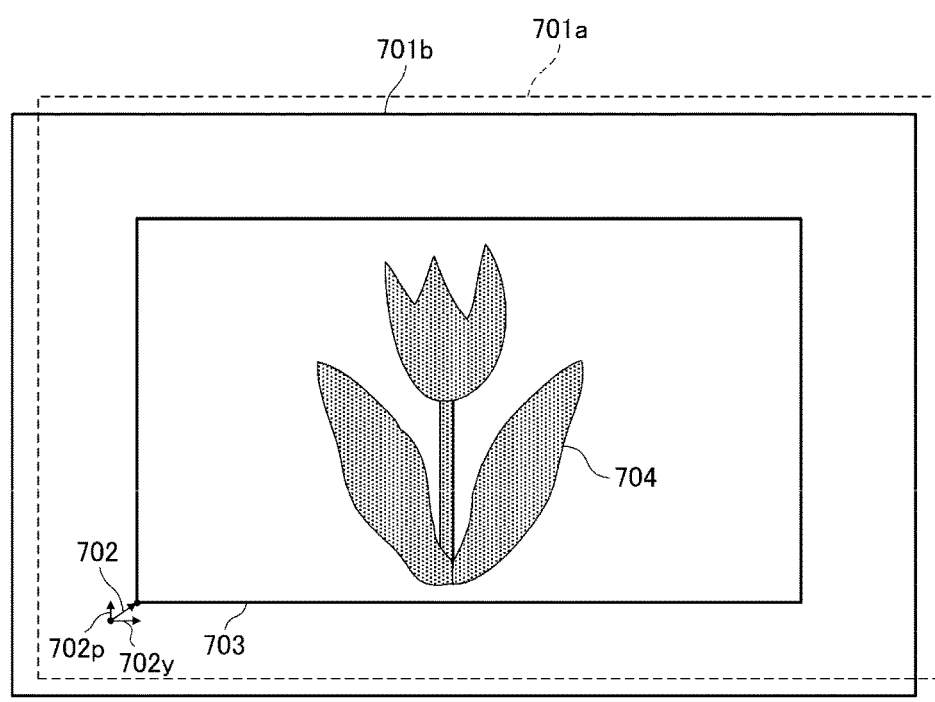

[Fig. 8]
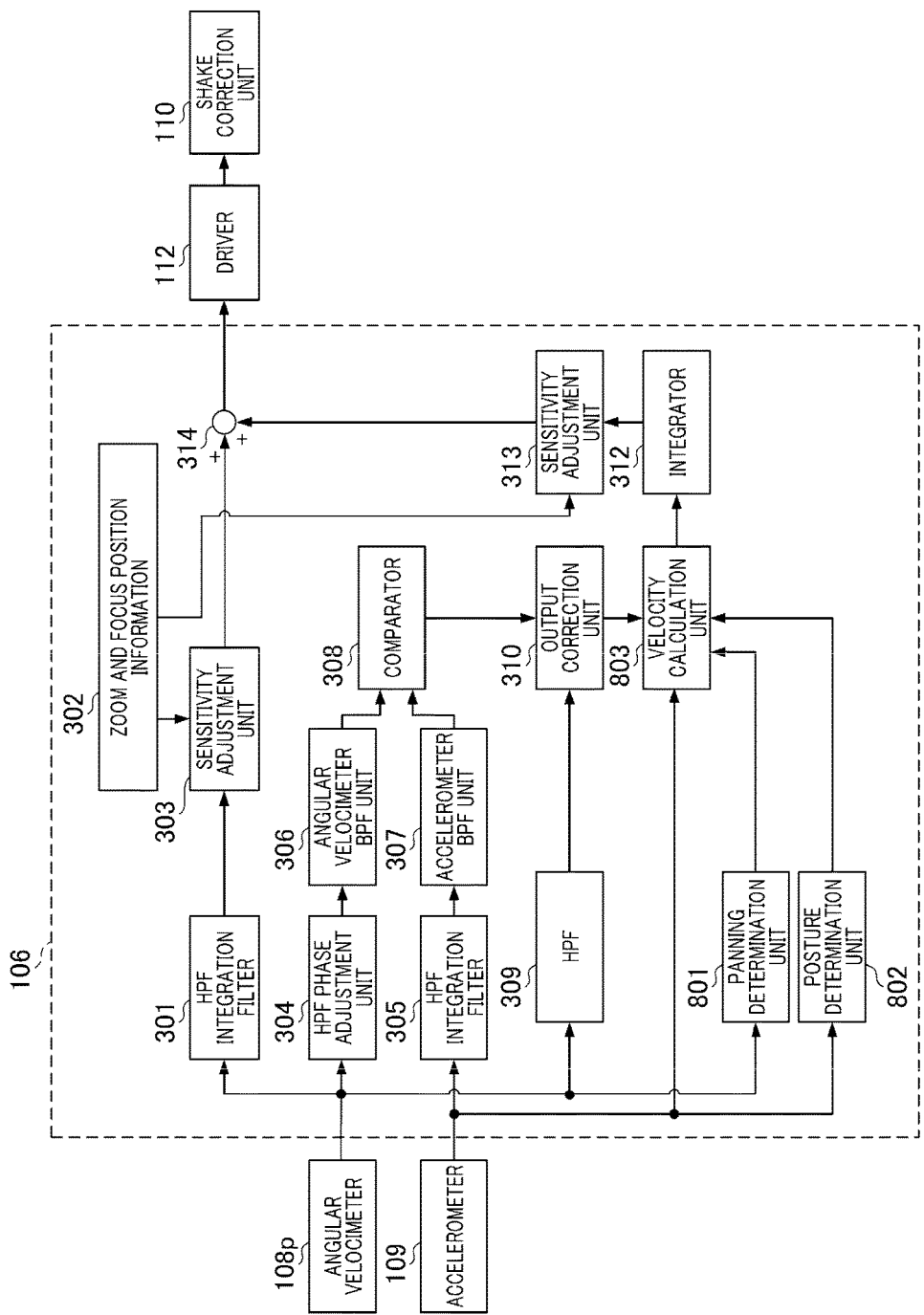

[Fig. 9]
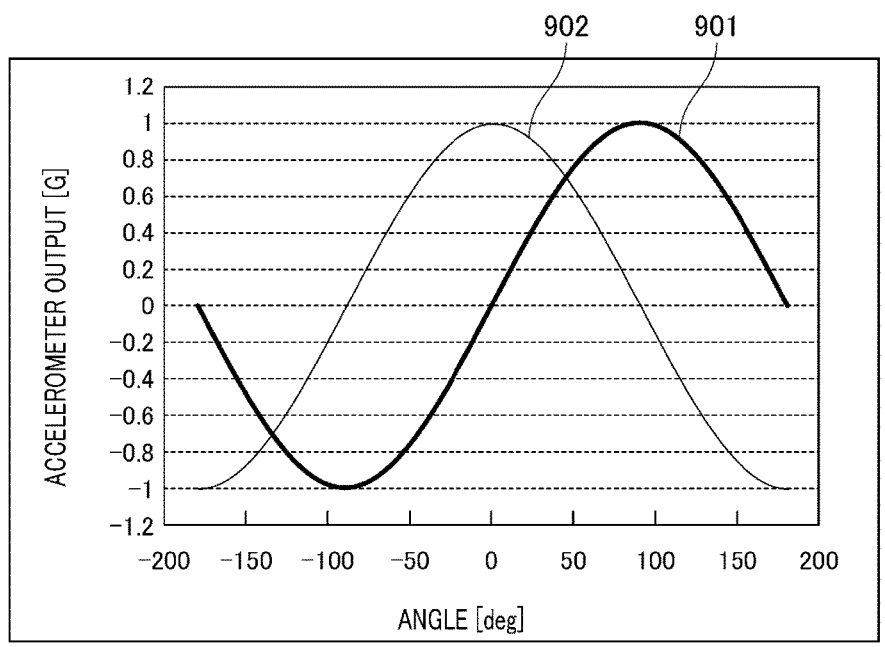

SHAKE CORRECTION DEVICE, IMAGE PICKUP APPARATUS, AND SHAKE CORRECTION METHOD

CROSS-REFERENCE TO RELATED APPLICATIONS

This application is a national stage application of International Application No. PCT/JP2016/002294 filed on May 10, 2016, whose benefit is claimed and which claims the benefit of Japanese Patent Application No. 2015-109363, filed May 29, 2015, the entire disclosure of which are incorporated herein by reference.

TECHNICAL FIELD

The present invention relates to a shake correction technology for correcting image shake that can arise from camera shake or the like.

BACKGROUND ART

Imaging devices include cameras provided with an image shake correction device having a shake detection unit and a shake correction unit that corrects image shake caused by camera shake or the like. Such an image shake correction device detects angular shake using an angular velocimeter or the like and reduces image shake on an imaging plane by moving a part of a lens group serving as the shake correction unit or an image sensor.

However, there are cases in photographing performed at a close distance or photographing with high photographic magnifying power in which an image is affected by shake that cannot be detected only with an angular velocimeter. Consequently, image deterioration can arise due to image shake caused by so-called parallel shake that is applied in a direction parallel to the optical axis of a camera or a direction perpendicular thereto. For example, if macro photographing is performed when a camera approaches a subject up to about 20 cm, or if the focal length of an imaging optical system is long (for example, 400 mm) even when the subject is about 1 m away from the camera, it is necessary to actively detect and correct parallel shake.

Patent Literature 1 discloses a technology in which parallel shake is obtained from double integration of acceleration detected by an accelerometer and then a shake correction unit is driven using an output of a separately provided angular velocimeter along therewith. In this case, the output of the accelerometer is affected by an environmental change such as disturbing noise or a temperature change. Since such an instability factor further expands as acceleration undergoes double integration, highly accurate correction of parallel shake is difficult.

Patent Literature 2 discloses a method for obtaining parallel shake by deeming it as angular shake when the center of rotation is assumed to be at a position away from a camera. In this method, an angular velocimeter and an accelerometer are provided, a correction value and an angle are obtained using the rotation radius of the angular shake from outputs of the meters and accordingly shake is corrected, and the center of rotation can be obtained limited to a frequency band in which influence of a disturbance is seldom received. Through the operation described above, the influence of an instability factor of an accelerometer as described above can be reduced.

CITATION LIST

Patent Literature

Patent Literature 1: Japanese Patent Laid-Open No. H7-225405
Patent Literature 2: Japanese Patent Laid-Open No. 2010-25962

In a method of correcting parallel shake using a rotation radius of angular shake, it is necessary to accurately calculate the rotation radius. However, with regard to a photography condition of a camera that is actually held in a hand, a condition for parallel shake occurring only due to the influence of one rotation is rare, and parallel shake occurs due to the influence of a plurality of rotations in most cases. In the method disclosed in Patent Literature 2, it is possible to correct parallel shake occurring due to a rotation that has the greatest influence, but it is hard to say that shake correction is performed accurately in all frequency bands at all times. In addition, while parallel shake of a low frequency is corrected accurately if influence of a rotation on the parallel shake is great in a low frequency band, there is a possibility of excessive correction affecting an effect of correcting image shake that is caused by parallel shake at a high frequency, unlike actual parallel shake.

SUMMARY OF INVENTION

The present invention performs highly accurate shake correction with respect to parallel shake in a wide frequency band.

A shake correction device according to an embodiment of the present invention includes a first computation unit configured to compute a first parallel shake correction amount from an angular velocity signal output from an angular velocity detection unit configured to detect shake and an acceleration signal output from an acceleration detection unit configured to detect shake; a second computation unit configured to compute a second parallel shake correction amount from the acceleration signal without using the angular velocity signal; a combining unit configured to perform a process of combining the first parallel shake correction amount and the second parallel shake correction amount and thereby compute a third parallel shake correction amount; and a control unit configured to correct an image shake by a shake correction unit using the third parallel shake correction amount.

Further features of the present invention will become apparent from the following description of exemplary embodiments with reference to the attached drawings.

BRIEF DESCRIPTION OF DRAWINGS

FIG. 1 is a top view of a camera in which a shake correction device according to an embodiment of the present invention is mounted.

FIG. 2 is a side view of the camera in which the shake correction device according to the embodiment of the present invention is mounted.

FIG. 3 is a block diagram of a shake correction device according to a first embodiment of the present invention.

FIG. 4 is a diagram for describing a rotation center of shake of a camera.

FIG. 5A is a diagrams exemplifying frequency characteristics of a velocity calculation filter according to the first embodiment of the present invention.

FIG. 5B is a diagrams exemplifying frequency characteristics of a velocity calculation filter according to the first embodiment of the present invention.

FIG. 6 is a block diagram of a shake correction device according to a second embodiment of the present invention.

FIG. 7 is an illustrative diagram of shake correction according to the second embodiment of the present invention.

FIG. 8 is a block diagram of a shake correction device according to a third embodiment of the present invention.

FIG. 9 is a graph of gravitational acceleration according to the third embodiment of the present invention.

DESCRIPTION OF EMBODIMENTS

Hereinafter, each embodiment of the present invention will be described in detail with reference to the accompanying drawings. The present invention is not limited to shake correction devices of digital single-lens reflex cameras or digital compact cameras, and can also be mounted in imaging devices such as optical apparatuses including lens devices, digital video cameras, surveillance cameras, web cameras, and mobile telephones.

First Embodiment

FIGS. 1 and 2 are schematic views showing functional configurations of a camera 101 equipped with a shake correction device according to a first embodiment of the present invention. FIG. 1 is a view taken when the camera 101 is viewed from above, and FIG. 2 is a view taken when the camera 101 is viewed from a side thereof. The shake correction device mounted in the camera 101 detects shake of the device and performs correction of image shake. Shake indicated by the arrows 103$p$ and 103$y$ represents shake (hereinbelow referred to as angular shake) with respect to two axes orthogonal to an optical axis 102. "p" represents the direction of pitch, and "y" represents the direction of yaw. In addition, shake indicated by the arrows 104$p$ and 104$y$ represents shake (hereinbelow referred to as parallel shake) in directions orthogonal to the optical axis 102.

The camera 101 has a release button 105, and a camera central processing unit (CPU) 106 is a central control unit that acquires manipulation signals S1 of the release button 105 and controls imaging operations. An image sensor 107 images subjects through an imaging optical system and outputs imaging signals.

Angular velocimeters 108$p$ and 108$y$ are first shake detection units that detect angular shake in the directions indicated by the arrows 108$pa$ and 108$ya$. In addition, accelerometers 109$p$ and 109$y$ are second detection units that detect parallel shake in the directions indicated by the arrows 109$pa$ and 109$ya$. Each output of the angular velocimeters 108$p$ and 108$y$, and the accelerometers 109$p$ and 109$y$ is input to the camera CPU 106. A shake correction unit 110 performs correction of shake to which both angular shake and parallel shake are added by driving a shake correction lens 111 in the directions of the arrows 110$p$ and 110$y$ of FIGS. 1 and 2. The camera CPU 106 outputs a control signal to a driver 112 and thus the driver 112 drives the shake correction unit 110.

In the present embodiment, so-called optical image shake correction in which the shake correction lens 111 is moved into a plane that is perpendicular to the optical axis based on a calculated correction amount is performed as an image shake correction method. Without being limited to such a method based on lens driving, there is a method of correcting image shake by moving the image sensor 107 into a plane perpendicular to the optical axis. Alternatively, there is an electronic image shake correction method in which influence of shake is reduced through image processing by changing an image cutting position of each photographed frame output by the image sensor 107. The effect of the present invention can be obtained when image shake correction is performed using any of the methods or a method obtained by combining the methods.

Next, a configuration of the shake correction device according to the present embodiment will be described with reference to FIG. 3. FIG. 3 is a functional block diagram exemplifying the shake correction device. In FIG. 3, only a configuration with respect to shake occurring in the vertical direction of the camera 101 (the direction of pitch; see the arrows 103$p$ and 104$p$ of FIG. 2) is shown. A similar configuration is also provided for shake occurring in the horizontal direction of the camera 101 (the direction of yaw; see the arrows 103$y$ and 104$y$ of FIG. 1). They are basically the same configuration except for the difference in the directions, and thus only the configuration of the direction of pitch will be described with illustration.

First, a calculation process of an angular shake amount will be described. An angular velocity detection signal output by the angular velocimeter 108$p$ is input to the camera CPU 106. The angular velocity detection signal is input to an HPF integration filter 301. The HPF integration filter 301 includes a high-pass filter (HPF) and an integration filter. In the HPF integration filter 301, the HPF cuts direct-current (DC) components of the input signal, the integration filter performs integration on the high-pass filter-processed signal, and thereby the angular velocity detection signal is converted into an angular signal. The frequency band of camera shake is between 1 Hz and 10 Hz. For this reason, the HPF has a primary HPF characteristic of cutting, for example, a frequency component equal to or lower than 0.1 Hz that is sufficiently far from the frequency band of camera shake. The output of the HPF integration filter 301 is input to a sensitivity adjustment unit 303.

The sensitivity adjustment unit 303 amplifies the output of the HPF integration filter 301 based on zoom and focus position information 302 and a focal distance and photographic magnifying power obtained therefrom, and thereby outputs a correction target value of the angular shake. The zoom and focus position information 302 is acquired from a zoom lens position detection unit and a focus lens position detection unit provided in the imaging optical system. A reason for providing the sensitivity adjustment unit 303 is that a change occurs in shake correction sensitivity which is a ratio of an amount of shake of a camera image plane to an amount of movement of the shake correction lens 111 due to a change in optical information with regard to zoom, focus, etc., and thus adjustment is necessary. The HPF integration filter 301 and the sensitivity adjustment unit 303 configure a computation unit for angular shake amounts.

Next, a calculation process of a parallel shake amount will be described. A parallel shake amount according to the present embodiment is calculated through the following steps.

(1) Calculating a first parallel shake velocity from a rotation radius (denoted as L) calculated focusing on a predetermined frequency and an output from the angular velocimeter 108$p$.

(2) Calculating a second parallel shake velocity from the first parallel shake velocity and an acceleration detection signal output by the accelerometer 109$p$.

(3) Calculating parallel shake displacement by performing integration on the second parallel shake velocity.

(4) Amplifying the parallel shake displacement based on the zoom and focus position information 302 and photographic magnifying power obtained therefrom and outputting a correction target value of the parallel shake.

In a method of correcting parallel shake from the first parallel shake velocity calculated using the rotation radius L and an output of the angular velocimeter 108p, it is difficult to calculate the first parallel shake velocity in all frequency bands with high accuracy. For this reason, a parallel shake velocity that brings a high correction effect is calculated only in a limited specific frequency band. However, in the photography condition during actual photographing with a camera held in a hand, parallel shake occurs due to influence of a plurality of rotations in most cases. After all, it is hard to say that, in a method of calculating a parallel shake amount by obtaining a rotation radius L and multiplying the rotation radius L by an angular velocity, shake is corrected accurately in all the frequency bands. In addition, there is a possibility of excessive correction affecting the effect of parallel shake correction at a high frequency band, unlike actual parallel shake.

In addition, as another calculation method with regard to a parallel shake correction amount, there is a method of calculating parallel shake displacement by performing double integration on an output signal of an acceleration sensor. In this case, the accelerometer 109p outputs an acceleration detection signal obtained by adding gravitational acceleration to shake acceleration derived from parallel shake. In detection of shake acceleration that is necessary for correcting parallel shake, gravitational acceleration changing according to a posture angle of a camera appears as noise. If this gravitational acceleration turns into very large output noise at a low frequency band and a signal thereof undergoes double integration, low-frequency noise is also amplified. Therefore, it is difficult to correctly detect parallel shake displacement caused by shake acceleration.

Thus, in the calculating of the second parallel shake velocity from the first parallel shake velocity and an output of the accelerometer 109p in the present embodiment, a weighted value of the first parallel shake velocity is set to be high in a low frequency band, and a weighted value of an output of the accelerometer is set to be high in a high frequency band, and they are combined. Accordingly, while noise in the high frequency band and noise in the low frequency band are reduced, two signals are combined and thus a parallel shake amount is calculated, and accordingly shake can be detected in the wide frequency bands with high accuracy. In other words, according to the present embodiment, in the method of calculating a parallel shake amount by multiplying a rotation radius L by a detected angular velocity, noise in a high frequency band that is difficult to remove can be removed. In addition, in the method of calculating a parallel shake amount from an output of the accelerometer, noise in a low frequency band that is difficult to remove can be removed.

A detailed computation method with respect to a parallel shake velocity and a correction target value according to the present embodiment will be described.

An angular velocity detection signal output by the angular velocimeter 108p is input to the HPF integration filter 301 and also input to an HPF 309. The HPF 309 cuts DC components of the input signal and outputs the components to an output correction unit 310. Simultaneously with this process, the angular velocity detection signal output by the angular velocimeter 108p is input to an HPF phase adjustment unit 304. The HPF phase adjustment unit 304 cuts DC components superimposed on the output of the angular velocimeter 108p and also performs phase adjustment on the signal. An HPF cutoff frequency of the HPF phase adjustment unit 304 matches an HPF cutoff frequency of an HPF integration filter 305 to be described below, and their frequency characteristics are set to coincide with each other. An output of the HPF phase adjustment unit 304 is input to an angular velocimeter band-pass filter (BPF) unit 306, and only frequency components of a predetermined band are extracted thereby.

On the other hand, an output of the accelerometer 109p is input to the HPF integration filter 305. After an HPF cuts DC components of the input signal in the HPF integration filter 305, an integration filter performs integration and thus converts an acceleration detection signal to a velocity signal. The HPF cutoff frequency of the HPF integration filter 305 is set to match the frequency characteristic of the HPF of the HPF phase adjustment unit 304 as described above. An output of the HPF integration filter 305 is input to an accelerometer band-pass filter (BPF) unit 307, and only frequency components of a predetermined band are extracted thereby.

A comparator 308 acquires outputs of each of the angular velocimeter BPF unit 306 and the accelerometer BPF unit 307 to calculate a rotation radius L. The calculation of the rotation radius L is performed using a method to be described below, and the result of the calculation is sent to the output correction unit 310. The output correction unit 310 calculates a first parallel shake velocity using the angular velocity detection signal that has undergone the HPF process that is the output of the HPF 309 and the rotation radius L acquired from the comparator 308.

Next, a correction value output from the comparator 308 to the output correction unit 310 (rotation radius L) will be described.

FIG. 4 is a diagram showing angular shake 103p and parallel shake 104p applied to the camera 101. Parallel shake at the position of a principal point of an imaging optical system within a photographing lens of the camera 101 is denoted by Y (see 104p), and the angle of shake is denoted by θ (see 103p). The relation between the rotation radius L (see 402p) when the center of rotation O (see 401p) is decided and Y and θ is expressed using the following formula (1). In addition, an angular velocity is denoted by ω, a velocity is denoted by V, and the relation between V, L, and ω is expressed using formula (2).

[Math. 1]

$$Y = L \times \theta \qquad (1)$$

$$V = L \times \omega \qquad (2)$$

$$A = L \times \omega a \qquad (3)$$

The rotation radius L is the distance from the rotation center 401p to the accelerometer 109p.

In formula (1), the ratio of displacement Y calculated by performing double integration on an output of the accelerometer 109p to the angle θ calculated by performing single integration on the output of the angular velocimeter 108p is the rotation radius L. In addition, in formula (2), the ratio of the velocity V calculated by performing single integration on the output of the accelerometer 109p to an angular velocity co that is the output of the angular velocimeter 108p is the rotation radius L. In the formula (3), the ratio of the acceleration A and the angular acceleration ωa is the rotation radius L. Acceleration A is obtained from the output of the accelerometer 109p, and angular acceleration ωa is obtained by performing single integration on the output of the angular velocimeter 108p. The rotation radius L can be obtained using any of the methods.

The comparator 308 acquires, for example, an angular velocity ωb that is an output of the angular velocimeter BPF unit 306 and a velocity Vb obtained by performing single integration on an output of the accelerometer BPF unit 307 and then calculates the rotation radius L using the following formula (4).

[Math. 2]

$$L = Vb/\omega b \qquad (4)$$

The rotation radius L can be calculated from the ratio of the peak values of the maximum amplitude of each of the velocity Vb and the angular velocity ωb within a predetermined period of time. The predetermined period of time is set to, for example, about 200 ms if the cutoff frequency of the angular velocimeter BPF unit 306 and the accelerometer BPF unit 307 is 5 Hz. Furthermore, the rotation radius L may be updated when each of the velocity Vb and the angular velocity ωb is calculated. Alternatively, in order to remove a high frequency noise component appearing when the rotation radius L is calculated, the comparator 308 averages each of the velocity Vb and the angular velocity ωb in a time series manner, or a process of cutting a high frequency component with a low-pass filter (LPF) may be performed.

The output correction unit 310 calculates the first parallel shake velocity using formula (2) from the rotation radius L calculated by the comparator 308 and the HPF-processed angular velocity detection signal that is an output of the HPF 309. The first parallel shake velocity is input to a velocity calculation unit 311. The output of the accelerometer 109p is simultaneously input to the velocity calculation unit 311. The velocity calculation unit 311 acquires the acceleration detection signal output by the accelerometer 109p and the first parallel shake velocity and then calculates a second parallel shake amount.

A process of calculating the second parallel shake velocity from the acceleration detection signal and the first parallel shake velocity using a Kalman filter that is an example of an estimator will be described below.

As shown in the following formula, state variables are set to Velocity (parallel velocity) and Accelbias (offset bias component of the accelerometer).

$$x = [\text{Velocity Accelbias}]^T \qquad [\text{Math. 3}]$$

A sampling cycle of computation using the Kalman filter is denoted by dt. An output variable y is set to a first parallel shake velocity output by the output correction unit 310, and an input variable u is set to acceleration output from the accelerometer 109p. A state equation can be expressed by formulas (5).

[Math. 4]

$$\begin{aligned} x_{k+1} &= Ax_k + Bu_k + Gw_k \\ y_k &= Cx_k + v_k \\ A &= \begin{bmatrix} 1 & -dt \\ 0 & 1 \end{bmatrix}, \\ B &= \begin{bmatrix} dt \\ 0 \end{bmatrix}, G = \begin{bmatrix} 0 \\ 1 \end{bmatrix}, \\ C &= [1 \ 0], D = [0] \end{aligned} \qquad (5)$$

-continued $$E[w(t)] = 0, \quad E[w(t)w^T(\tau)] = Q\delta(t - \tau) \qquad (6)$$
$$E[v(t)] = 0, \quad E[v(t)v^T(\tau)] = R\delta(t - \tau)$$

In the above formulas, $w_k$ is system noise (noise of the accelerometer), and $v_k$ is observation noise (noise included in the first parallel shake velocity that is an output of the output correction unit 310).

Kalman gain g and a state estimation value (indicated by adding the symbol '^' above $x_k$) are obtained as follows.

[Math. 5]

Preliminary Prediction Step $$\hat{x}^-_k = A\hat{x}_{k-1} + Bu_{k-1} \qquad (7)$$

$$P^-_k = AP_{k-1}A^T + BQB^T \qquad (8)$$

Filtering Step $$g_k = \frac{P^-_k C^T}{CP^-_k C^T + R} \qquad (9)$$

$$\hat{x}_k = \hat{x}^-_k + g_k(y_k - C\hat{x}^-_k) \qquad (10)$$

$$P_k = (I - g_k C)P^-_k \qquad (11)$$

Here, "$Q = \sigma_w^2$" indicating the value of variance of system noise and "$R = \sigma_v^2$" indicating the value of variance of observation noise are set as follows.

The variance Q of the system noise is set from sensor noise of the accelerometer 109p that is system noise applied to an input terminal. In addition, the variance R of the observation noise is set from noise included in the first parallel shake velocity that is the output of the output correction unit 310. The Kalman gain g changes according to the magnitude of the variance Q and R. If the value of the variance Q is set to be high, the second parallel shake velocity (shake correction velocity) is calculated such that a weighted value of the first parallel shake velocity increases. In addition, if the value of the variance R is set to be high, the second parallel shake velocity is calculated such that a weighted value of the output of the accelerometer 109p increases. The velocity calculation unit 311 decides the value of Q and the value of R according to a photography condition of the camera 101 when it is held in a hand, and thereby calculates the second parallel shake velocity.

In addition, a shaking state of the camera 101 can be detected and then the Kalman gain g can be set in accordance with the shaking state. For example, if shaking is slight, it can have a small parallel shake amount of a relatively high frequency, rather than a large parallel shake amount of a low frequency. Thus, if shaking is slight, an angle change amount of a posture of the camera is small and noise of an output of the accelerometer caused by a change in the influence of gravity is relatively small, and thus the value of the variance R can be set to be high. After all, the second parallel shake velocity is calculated with a weighted value set to be relatively high to an output of the accelerometer 109p. On the other hand, if shaking is vigorous and great parallel shake of a low frequency is dominant, the angle change amount of a posture of the camera is large and noise of the output of the accelerometer caused by a change in the influence of gravity is large, and therefore, the value of the variance Q is set to be high. After all, the second parallel shake velocity is calculated with a weighted value of the first parallel shake velocity set to be relatively high, and thus the influence of an output error of the accelerometer on correction of image shake can be reduced.

In detection of the shaking state of the camera 101, either or both of the outputs of the angular velocimeter 108p and the accelerometer 109p can be used. A shaking state detection unit, for example, causes the output of the angular velocimeter 108p or the output of the accelerometer 109p to pass through the HPF and thereby causes an HPF-processed signal to be converted into the absolute value. The shaking state detection unit measures the number of times that the signal that has been converted into the absolute value exceeds the threshold value of a predetermined level within a predetermined period of time, and compares the number of times to a predetermined threshold value. If the measured number of times is equal to or smaller than the predetermined threshold value, a state is determined to be a state of slight shaking, and if the measured number of times is greater than the predetermined threshold value, a state is determined to be a state of vigorous shaking. Alternatively, in another method, the shaking state detection unit compares the level of a signal generated using the average of movement from the signal that has been converted into the absolute value, an LPF or the like to the predetermined threshold value.

If the level of the signal is equal to or lower than the predetermined threshold value, a state is determined to be a state of slight shaking, and if the level of the signal is higher than the predetermined threshold value, a state is determined to be a state of vigorous shaking.

Through the above-described process, it is possible to calculate an optimum parallel shake velocity in accordance with a shaking state with a simple configuration. Note that, although the calculation process of the second parallel shake velocity using a Kalman filter has been described as an example, there are other methods (refer to FIGS. 5A and 5B). For example, a low-pass filtering process is performed on the first parallel shake velocity that is an output of the output correction unit 310. An LPF-processed velocity (LPF velocity) undergoes integration and thereby an angle (LPF angle) is calculated. A high-pass filtering process is performed on the output of the accelerometer 109p. An HPF-processed velocity (HPF velocity) undergoes integration and thus an angle (HPF angle) is calculated. By adding the LPF angle to the HPF angle, the second parallel shake velocity can be calculated. FIG. 5A illustrates characteristics of the low-pass filter, and FIG. 5B illustrates characteristics of the high-pass filter. The characteristic of phase is shown in the upper part, the characteristic of gain is shown in the lower part, and the horizontal axes represent frequency axes. In this method, a cutoff frequency 501 of the LPF and a cutoff frequency 502 of the HPF are set to the same value. The second parallel shake velocity can be calculated based on the first parallel shake velocity from the output correction unit 310 in a low frequency band, and the second parallel shake velocity can be calculated based on the output of the accelerometer 109p in a high frequency band. In this case, using either or both of the outputs of the angular velocimeter 108p and the accelerometer 109p, a shaking state of the camera 101 is determined as above. The cutoff frequencies 501 and 502 of the filters are changed according to the result of the determination of the shaking state. For example, when the camera 101 is determined to be in a state in which its shaking is greater than a threshold value, the cutoff frequencies 501 and 502 are set to low values, and an additive combining process is performed such that a ratio of parallel shake calculated from the accelerometer 109p becomes high. In addition, when the camera 101 is determined to be in a state in which its shaking is smaller than the threshold value, the cutoff frequencies 501 and 502 are set to high values, and the additive combining process is performed such that the ratio of the output of the first parallel shake velocity calculated using the rotation radius L becomes high. With this operation, an optimum parallel shake velocity can be calculated in accordance with a shaking state of the camera 101.

The velocity calculation unit 311 of FIG. 3 outputs the calculated second parallel shake velocity to an integrator 312. The integrator 312 calculates parallel shake displacement through integration and outputs the result to a sensitivity adjustment unit 313. The sensitivity adjustment unit 313 amplifies the output of the integrator 312 based on the zoom and focus position information 302 and the photographic magnifying power obtained from the information, and outputs a correction target value of the parallel shake to an adder 314. The adder 314 adds the correction target value of the angular shake that is the output of the sensitivity adjustment unit 303 to the correction target value of the parallel shake that is the output of the sensitivity adjustment unit 313. Thereby, a shake correction target value is calculated and then output to the driver 112.

The shake correction target value computed by the sensitivity adjustment unit 303, the sensitivity adjustment unit 313, and the adder 314 is denoted by δ. The focal length of the imaging optical system is denoted by f, the photographic magnifying power by β, and the shake correction sensitivity by Ts. The shake correction sensitivity Ts is a ratio of the amount of shaking on the camera image plane to a movement amount of the shake correction unit 110. The shake correction target value δ is calculated with the following formula (12) using the parallel shake Y and the angle of shake θ of the imaging optical system, the focal length f and the photographic magnifying power β of the imaging optical system, and the shake correction sensitivity Ts.

[Math. 6]

$$\delta = \frac{(1+\beta) \times f}{Ts} \times \theta + \frac{\beta}{Ts} \times Y \qquad (12)$$

The first term on the right side of formula (12) is an angular shake correction amount that is an output of the sensitivity adjustment unit 303, and the second term on the right side is a parallel shake correction amount that is an output of the sensitivity adjustment unit 313. The shake correction target value δ that is the output of the adder 314 calculated as described above is input to the driver 112. Based on the shake correction target value δ, the driver 112 drives the shake correction unit 110, and a shake correction operation is performed according to movement of the shake correction lens 111.

In the present embodiment, the first parallel shake velocity is calculated by multiplying the rotation radius L by the detected angular velocity. Signals are combined such that a weighted value of the first parallel shake velocity is set to be high in the low frequency band and a weighted value of the parallel shake velocity obtained from an acceleration output is set to be high in the high frequency band, and thereby the second parallel shake velocity is calculated. The parallel shake displacement is calculated through integration of the second parallel shake velocity, and the shake correction target value of the parallel shake whose sensitivity has been adjusted is obtained. According to the present embodiment, it is possible to detect shake with high accuracy over a wide frequency band by combining two signals and calculating a parallel shake amount while removing noise components in each of a high frequency band and a low frequency band, the effect of correcting image shake for parallel shake improves.

Second Embodiment

Next, a second embodiment of the present invention will be described. The reference numerals used above will be used for the same constituent elements of the present embodiment as those of the first embodiment, detailed description thereof will be omitted, and differences will be mainly described. Such omission of description also applies to the embodiment to be described below.

A shake correction device according to the present embodiment will be described with reference to FIG. 6. FIG. 6 is a control block diagram of the shake correction device. Features of the present embodiment are as follows.

A motion vector calculation unit 601 that calculates motion vectors of captured images is provided.

A cutting amount adjustment unit 604 and an image cutting shake correction unit 605 are provided.

In the present embodiment, the motion vector calculation unit 601 that is a detection unit of the first parallel shake velocity detects shake of a device from image data output by the image sensor 107. In other words, the motion vector calculation unit 601 compares images output by the image sensor 107 at different times, and performs a calculation process of a motion vector. In a method of detecting camera shake or a shift of a composition using a motion vector, shake can be detected based on image data obtained from actual capturing. An image shift amount is obtained based on the motion vector indicating a detected shift of an image, and by performing a cutting process of a frame image according to the image shift amount, image shake occurring in photographing of a dynamic image can be corrected. At this time, the following points should be noted.

A motion vector is detected in each captured frame image, and thus there are cases in which a frequency band that is accurately detectable is limited depending on a frame rate. In addition, since a shift of a subject image from an image is detected using a vector, it is not possible to ignore a time delay in actual image shake. Consequently, there is a possibility of detection accuracy becoming high in a low frequency band, but becoming low in a high frequency band. Thus, in the present embodiment, control is performed such that a weighted value of the amount of shaking detected using a motion vector is set to be high in a low frequency band and a weighted value of an output of an acceleration sensor is set to be high in a high frequency band. A shake correction amount is calculated by combining signals of which the weighted values have been controlled, and thus accuracy in detecting a parallel shake amount can be improved.

In the present embodiment, a parallel shake amount is detected using a motion vector and electronic correction of image shake is performed using a cut image in correction of parallel shake. In other words, the cutting amount adjustment unit 604 and the image cutting shake correction unit 605 do not drive optical members, but image shake is corrected through image processing. On the other hand, with respect to correction of angular shake, optical correction of image shake is performed through driving of the shake correction lens 111 as in the first embodiment. For the shake detection signal detected by the angular velocimeter 108$p$, the HPF integration filter 301 performs an HPF process and integration, and further the sensitivity adjustment unit 303 performs adjustment of sensitivity. A correction target value of angular shake of which sensitivity has been adjusted using the zoom and focus position information 302 is input to the driver 112, and then the shake correction unit 110 corrects the angular shake.

Calculation of a motion vector performed by the motion vector calculation unit 601 will be described in detail below.

The image sensor 107 photoelectrically converts light reflected from a subject into an electric signal and thereby acquires image information. The acquired image information is converted into a digital signal, and the conversion-processed digital image data is sent to the motion vector calculation unit 601. At this point in time, the motion vector calculation unit 601 acquires image data one frame before stored in a memory beforehand, and compares the current image data and the past image data that is temporally continuous. The motion vector calculation unit 601 calculates a motion vector from information of a relative shift between the images of the different times. Image information extracted at that time includes data of an entire image, or data of a part of an image. Alternatively, the motion vector calculation unit 601 calculates motion vectors by comparing image data of each of small regions that are obtained by dividing an image into a plurality of regions, and selects an optimum motion vector therefrom. A method of a motion vector calculation process is not limited.

The motion vector calculation unit 601 outputs information of the calculated motion vector to a velocity calculation unit 602. The velocity calculation unit 602 executes a velocity calculation process using the information of the acquired motion vector and an output of the accelerometer 109$p$. First, the velocity calculation unit 602 converts the motion vector into a parallel shake velocity amount V. The velocity of the motion vector is denoted by Vm, a pitch of one pixel by P, and photographic magnifying power based on the zoom and focus position information 302 by $\beta$.

Through the following formula (13), the velocity Vm is converted into the parallel shake velocity amount V.

[Math. 7]

$$V = Vm \lambda P / \beta \qquad (13)$$

The velocity calculation unit 602 uses the parallel shake velocity amount V obtained through formula (13) as a first parallel shake velocity and calculates a second parallel shake velocity using formulas (5) to (11) as in the first embodiment.

The second parallel shake velocity output by the velocity calculation unit 602 is input to the integrator 603. The integrator 603 calculates parallel shake displacement through integration, and outputs the parallel shake displacement to the cutting amount adjustment unit 604. The cutting amount adjustment unit 604 sets an image cutting position based on the zoom and focus position information 302 and the photographic magnifying power $\beta$ obtained therefrom. The information of the image cutting position output by the cutting amount adjustment unit 604 is input to the image cutting shake correction unit 605. The image cutting shake correction unit 605 performs correction of parallel shake through image cutting according to the acquired image cutting position. Electronic correction of image shake based on a cutting process of image data will be described with reference to FIG. 7.

FIG. 7 is a diagram for describing a state of the image cutting shake correction unit 605 performing an image shift process. A target image is a captured image generated from an output of the image sensor 107. In the image shift process, an output region out of the captured image is changed. For example, an image 701*a* of FIG. 7 indicates an output image of the image sensor 107 that is photographed at a photographing time T1. An image 701*b* indicates an output image of the image sensor 107 that is photographed at a photographing time T2 that arrives after a predetermined period of time elapses from the photographing time T1 (for example, after 1/30 of a second).

An imaging device that is not provided with a shake correction unit that corrects image shake in an optical manner by causing a photographic optical axis to be eccentric is affected by a positional shift between the two images 701*a* and 701*b* according to angular shake and parallel shake. In the present embodiment, since the driver 112 and the shake correction unit 110 perform correction of angular shake, a shift occurs in the compositions of the images 701*a* and 701*b* only due to influence of parallel shake. The cutting amount adjustment unit 604 calculates image cutting movement amounts for each photographed frame in the horizontal and vertical directions from parallel shake amounts of an image in the horizontal and vertical directions. A first vector represented by the arrow 702*y* of FIG. 7 indicates an image cutting movement amount in the horizontal direction, and a second vector represented by the arrow 702*p* indicates the image cutting movement amount in the vertical direction. When the first vector and the second vector are combined, the vector represented by the arrow 702, i.e., a combined vector equivalent to the image cutting movement amounts, is obtained.

The image cutting shake correction unit 605 shifts the image cutting position using the information of the image cutting movement amounts acquired from the cutting amount adjustment unit 604. Accordingly, a cut image of the image 701*a* at the photographing time T1 is an image 703, and a cut image of the image 701*b* at the photographing time T2 is the image 703. In other words, a dynamic image is photographed in a state in which image shake of the image of the main subject 704 is suppressed. The image cutting shake correction unit 605 corrects the parallel shake for each photographed frame through the image cutting process. In this manner, correction of parallel shake and correction of angular shake are simultaneously executed during photographing of a dynamic image.

In the present embodiment, a correction processing unit of angular shake calculates an amount of angular shake correction from an output of the angular velocimeter 108*p*, and corrects image shake by causing the photographic optical axis to be eccentric. A correction processing unit of parallel shake calculates an amount of parallel shake correction from a motion vector and an output of the accelerometer 109*p*, and corrects image shake through an image cutting process by shifting an output region of a photographed image. According to the present embodiment, it is possible to correct image shake with high accuracy.

Third Embodiment

Next, a third embodiment of the present invention will be described.

FIG. 8 is a control block diagram of a shake correction device according to the present embodiment. A difference from the first embodiment (see FIG. 3) is that two determination units 801 and 802 are provided. The determination unit 801 is a panning determination unit 801 that determines a state of panning (hereinbelow referred to as panning determination). In addition, the determination unit 802 is a posture determination unit that determines changes of postures of the imaging device. Each output of the panning determination unit 801 and the posture determination unit 802 is input to a velocity calculation unit 803. A feature of the present embodiment is that the velocity calculation unit 803 changes a combination ratio of a first parallel shake velocity and a velocity obtained from an output of the accelerometer 109*p* based on a panning determination result of the panning determination unit 801 and a posture determination result of the posture determination unit 802.

First, a panning state determination process performed by the panning determination unit 801 will be described. In the panning determination state, the panning determination unit 801 acquires an output of the angular velocimeter 108*p* and compares it to a predetermined threshold value. Time during which a level of an angular velocity detection signal is equal to or higher than the predetermined threshold value (detection time) is measured. If the detection time is equal to or longer than a predetermined period of time, the panning determination unit 801 determines that a panning operation is underway. The predetermined period of time refers to a reference time set in advance to determine a panning continuation period. The panning determination unit 801 outputs the result of the panning determination indicating whether the panning operation by a user is underway to the velocity calculation unit 803.

Since a tilt angle of a camera changes during panning, a component derived from influence of gravity is easily superimposed on the output of the accelerometer 109*p*. In addition, since the rotation radius L (see FIG. 4) resulting from a panning operation is dominant during panning, the accuracy of detection of a parallel velocity is high. For this reason, the velocity calculation unit 803 changes a combination ratio when a panning state is determined such that the weighted value of the output of the accelerometer 109 is set to be relatively low and the weighted value of the first parallel shake velocity is set to be relatively high. As a result of performing correction of image shake using a second parallel shake velocity computed using this combination ratio, the effect of correction of parallel shake improves. As a result, a signal close to actual parallel shake is generated, and the parallel shake is corrected based on that signal. Note that the same process is also performed with respect to determination of a tilt state. In this case, a tilt determination unit changes a combination ratio when a tilt state is determined such that the weighted value of an output of the accelerometer 109 is set to be relatively low and the weighted value of a first parallel shake velocity is set to be relatively high.

Next, a posture determination process performed by the posture determination unit 802 will be described.

If a tri-axial accelerometer is used for the accelerometer 109, an output thereof is input to the posture determination unit 802, and the posture determination unit 802 calculates a tilt angle of a camera. Measurement axes of the accelerometer 109 are set to an X axis, a Y axis, and a Z axis, and the X axis is defined as the axis of the horizontal direction within an imaging plane of an image sensor. In addition, the Y axis is defined as the axis of the vertical direction within the imaging plane of the image sensor, and the Z axis is defined as the axis of the optical axis direction of the camera. After all, the camera is disposed to face the Z axis direction that is orthogonal to the imaging plane (X-Y plane), and a tilt angle of the camera can be calculated from the relation of acceleration outputs of each of the axes. Different influence of posture changes of the camera on gravitational acceleration will be described with reference to FIG. 9.

FIG. 9 illustrates a change of an output of the accelerometer 109 resulting from a roll angle change of a camera when the angle at a camera home position is set to 0 degrees. The camera home position corresponds to, when a user holds the camera in its lateral position, a reference posture in which an axis of an image sensor thereof in the left-right direction is perpendicular to the direction of gravity. The horizontal axis of FIG. 9 represents an angle (unit: degrees), and the vertical axis thereof represents output of the accelerometer 109 (unit: G). A graph line 901 indicates change of an output of the X axis, and a graph line 902 indicates change of an output of the Y axis.

An amount of change of gravitational acceleration on the Y axis with respect to the change of the roll angle is small in the vicinity of the camera home position whose angle is 0 degrees, but an amount of change of gravitational acceleration on the X axis with respect to the change of the roll angle is large since the slope around 0 degrees is steep. Thus, the weighted value of an output of the accelerometer 109 is controlled to be high on the Y axis near the camera home position. That is, accuracy in calculation of a second parallel shake velocity increases. However, if the weighted value of an output of the accelerometer 109 is set to be high on the X axis, there is a possibility of an erroneous computation of a second parallel shake velocity brought about by the influence of a change in the gravitational acceleration. Thus, the weighted value of the output of the accelerometer 109 is set to be low on the X axis and then a process of calculating the second parallel shake velocity is performed. In addition, in a vertical position of the camera, i.e., in a posture in which its angle is 90 degrees or −90 degrees, the influence of the gravitational acceleration on the X and Y axes becomes opposite that when the angle of the posture is 0 degrees. Thus, by setting the weighted value of the output of the accelerometer 109 to be low on the Y axis and the weighted value of the output of the accelerometer 109 to be high on the X axis, the second parallel shake velocity is calculated. By changing the combination ratio according to the change of the posture of the camera in that manner, an optimum amount of correction of parallel shake for a posture of the camera can be calculated.

Combination ratio change methods include a method of changing a combination ratio by changing Kalman gain of a Kalman filter, as described in the first embodiment. Alternatively, a second parallel shake velocity may be calculated as another method. For example, a velocity calculation unit performs an LPF process on a first parallel shake velocity that is an output of the output correction unit 310 and calculates an LPF-processed velocity (LPF velocity). In addition, the velocity calculation unit performs an HPF process on an output of the accelerometer 109p and then integration thereon, and thereby calculates an HPF- and integration-processed velocity (HPF velocity). A second parallel shake velocity can be calculated by adding the LPF velocity to the HPF velocity. In this method, with regard to the LPF and the HPF that are set to have the same cutoff frequency, the second parallel shake velocity may be calculated by changing the cutoff frequency according to a posture of a camera.

In the present embodiment, based on a panning (or tilting) determination result or a posture determination result, a process of changing a combination ratio between a first parallel shake velocity and a parallel shake velocity obtained from an output of the accelerometer 109 is performed. The value of the combination ratio is properly changed, then a second parallel shake velocity is calculated, and the parallel shake is corrected, and therefore, proper correction of image shake can be realized in accordance with a state or a posture of a camera.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Shakeay Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-109363, filed May 29, 2015, which is hereby incorporated by reference wherein in its entirety.

The invention claimed is:

1. A shake correction device comprising:
a first computation unit configured to compute a first parallel shake correction amount from an angular velocity signal output from an angular velocity detection unit configured to detect shake and an acceleration signal output from an acceleration detection unit configured to detect shake;
a second computation unit configured to compute a second parallel shake correction amount from the acceleration signal without using the angular velocity signal;
a combining unit configured to perform a process of combining the first parallel shake correction amount and the second parallel shake correction amount and thereby compute a third parallel shake correction amount; and
a control unit configured to correct an image shake by a shake correction unit using the third parallel shake correction amount,
wherein the first parallel shake correction amount is a correction amount of a low frequency component of the shake, and the second parallel shake correction amount is a correction amount of a high frequency component of the shake.

2. A shake correction device comprising:
a first computation unit configured to compute a first parallel shake correction amount from an angular velocity signal output from an angular velocity detection unit configured to detect shake and an acceleration signal output from an acceleration detection unit configured to detect shake;
a second computation unit configured to compute a second parallel shake correction amount from the acceleration signal without using the angular velocity signal;
a combining unit configured to perform a process of combining the first parallel shake correction amount and the second parallel shake correction amount and thereby compute a third parallel shake correction amount; and
a control unit configured to correct an image shake by a shake correction unit using the third parallel shake correction amount,
wherein the combining unit sets a weighted value of the first parallel shake correction amount to be higher than a weighted value of the second parallel shake correction amount for a low frequency component of the shake, and sets the weighted value of the second parallel shake correction amount to be higher than the weighted value of the first parallel shake correction amount for a high frequency component of the shake.

3. A shake correction device comprising:
a first computation unit configured to compute a first parallel shake correction amount from an angular velocity signal output from an angular velocity detection unit configured to detect shake and an acceleration signal output from an acceleration detection unit configured to detect shake;
a second computation unit configured to compute a second parallel shake correction amount from the acceleration signal without using the angular velocity signal;
a combining unit configured to perform a process of combining the first parallel shake correction amount and the second parallel shake correction amount and thereby compute a third parallel shake correction amount; and
a control unit configured to correct an image shake by a shake correction unit using the third parallel shake correction amount,
wherein the first computation unit computes a rotation radius from a signal obtained by performing integration on the acceleration signal and the angular velocity signal and then computes the first parallel shake correction amount from the rotation radius and the signal obtained by performing integration on the angular velocity signal.

4. A shake correction device comprising:
a first computation unit configured to compute a first parallel shake correction amount from an angular velocity signal output from an angular velocity detection unit configured to detect shake and an acceleration signal output from an acceleration detection unit configured to detect shake;
a second computation unit configured to compute a second parallel shake correction amount from the acceleration signal without using the angular velocity signal;
a combining unit configured to perform a process of combining the first parallel shake correction amount and the second parallel shake correction amount and thereby compute a third parallel shake correction amount; and
a control unit configured to correct an image shake by a shake correction unit using the third parallel shake correction amount,
wherein, when noise of the angular velocity detection unit is greater than a predetermined value, the combining unit sets a weighted value of the second parallel shake correction amount to be higher than that when the noise is smaller than the predetermined value.

5. A shake correction device comprising:
a first computation unit configured to compute a first parallel shake correction amount from an angular velocity signal output from an angular velocity detection unit configured to detect shake and an acceleration signal output from an acceleration detection unit configured to detect shake;
a second computation unit configured to compute a second parallel shake correction amount from the acceleration signal without using the angular velocity signal;
a combining unit configured to perform a process of combining the first parallel shake correction amount and the second parallel shake correction amount and thereby compute a third parallel shake correction amount; and
a control unit configured to correct an image shake by a shake correction unit using the third parallel shake correction amount,
wherein, when noise of the acceleration detection unit is greater than a predetermined value, the combining unit sets a weighted value of the first parallel shake correction amount to be higher than that when the noise is smaller than the predetermined value.

6. A shake correction device comprising:
a first computation unit configured to compute a first parallel shake correction amount from an angular velocity signal output from an angular velocity detection unit configured to detect shake and an acceleration signal output from an acceleration detection unit configured to detect shake;
a second computation unit configured to compute a second parallel shake correction amount from the acceleration signal without using the angular velocity signal;
a combining unit configured to perform a process of combining the first parallel shake correction amount and the second parallel shake correction amount and thereby compute a third parallel shake correction amount; and
a control unit configured to correct an image shake by a shake correction unit using the third parallel shake correction amount,
wherein, when shake of the shake correction device is smaller than a predetermined value, the combining unit sets a weighted value of the second parallel shake correction amount to be higher than that when the shake is greater than the predetermined value.

7. A shake correction device comprising:
a first computation unit configured to compute a first parallel shake correction amount from an angular velocity signal output from an angular velocity detection unit configured to detect shake and an acceleration signal output from an acceleration detection unit configured to detect shake;
a second computation unit configured to compute a second parallel shake correction amount from the acceleration signal without using the angular velocity signal;

a combining unit configured to perform a process of combining the first parallel shake correction amount and the second parallel shake correction amount and thereby compute a third parallel shake correction amount; and a control unit configured to correct an image shake by a shake correction unit using the third parallel shake correction amount, wherein, when shake of the shake correction device is greater than a predetermined value, the combining unit sets a weighted value of the first parallel shake correction amount to be higher than that when the shake is smaller than the predetermined value.

8. A shake correction device comprising:

a first computation unit configured to compute a first parallel shake correction amount from an angular velocity signal output from an angular velocity detection unit configured to detect shake and an acceleration signal output from an acceleration detection unit configured to detect shake;

a second computation unit configured to compute a second parallel shake correction amount from the acceleration signal without using the angular velocity signal;

a combining unit configured to perform a process of combining the first parallel shake correction amount and the second parallel shake correction amount and thereby compute a third parallel shake correction amount; and a control unit configured to correct an image shake by a shake correction unit using the third parallel shake correction amount, wherein, when a state is determined to be a panning state, the combining unit sets a weighted value of the first parallel shake correction amount to be higher than that when a state is determined not to be a panning state.

9. A control method for a shake correction device, the method comprising:

computing a first parallel shake correction amount from an angular velocity signal output from an angular velocity detection unit, configured to detect shake, and an acceleration signal output from an acceleration detection unit, configured to detect shake;

computing a second parallel shake correction amount from the acceleration signal without using the angular velocity signal;

combining the first parallel shake correction amount and the second parallel shake correction amount to compute a third parallel shake correction amount; and correcting an image shake by a shake correction device using the third parallel shake correction amount, wherein the first parallel shake correction amount is a correction amount of a low frequency component of the shake, and the second parallel shake correction amount is a correction amount of a high frequency component of the shake.

10. A control method for a shake correction device, the method comprising:

computing a first parallel shake correction amount from an angular velocity signal output from an angular velocity detection unit configured to detect shake and an acceleration signal output from an acceleration detection unit configured to detect shake;

computing a second parallel shake correction amount from the acceleration signal without using the angular velocity signal;

combining the first parallel shake correction amount and the second parallel shake correction amount to compute a third parallel shake correction amount; and correcting an image shake by a shake correction unit using the third parallel shake correction amount, wherein the combining step sets a weighted value of the first parallel shake correction amount to be higher than a weighted value of the second parallel shake correction amount for a low frequency component of the shake, and sets the weighted value of the second parallel shake correction amount to be higher than the weighted value of the first parallel shake correction amount for a high frequency component of the shake.

11. A control method for a shake correction device, the method comprising:

computing a first parallel shake correction amount from an angular velocity signal output from an angular velocity detection unit configured to detect shake and an acceleration signal output from an acceleration detection unit configured to detect shake;

computing a second parallel shake correction amount from the acceleration signal without using the angular velocity signal;

combining the first parallel shake correction amount and the second parallel shake correction amount to compute a third parallel shake correction amount; and correcting an image shake by a shake correction unit using the third parallel shake correction amount, wherein the step of computing the first parallel shake correction amount computes a rotation radius from a signal obtained by performing integration on the acceleration signal and the angular velocity signal and then computes the first parallel shake correction amount from the rotation radius and the signal obtained by performing integration on the angular velocity signal.

12. A control method for a shake correction device, the method comprising:

computing a first parallel shake correction amount from an angular velocity signal output from an angular velocity detection unit configured to detect shake and an acceleration signal output from an acceleration detection unit configured to detect shake;

computing a second parallel shake correction amount from the acceleration signal without using the angular velocity signal;

combining the first parallel shake correction amount and the second parallel shake correction amount to compute a third parallel shake correction amount; and correcting an image shake by a shake correction unit using the third parallel shake correction amount, wherein, when noise of the angular velocity detection unit is greater than a predetermined value, setting in the combining step a weighted value of the second parallel shake correction amount to be higher than that when the noise is smaller than the predetermined value.

13. A control method for a shake correction device, the method comprising:

computing a first parallel shake correction amount from an angular velocity signal output from an angular velocity detection unit configured to detect shake and an acceleration signal output from an acceleration detection unit configured to detect shake;

computing a second parallel shake correction amount from the acceleration signal without using the angular velocity signal;

combining the first parallel shake correction amount and the second parallel shake correction amount to compute a third parallel shake correction amount; and correcting an image shake by a shake correction unit using the third parallel shake correction amount, wherein, when noise of the acceleration detection unit is greater than a predetermined value, setting in the combing step a weighted value of the first parallel shake correction amount to be higher than that when the noise is smaller than the predetermined value.

14. A control method for a shake correction device, the method comprising:

computing a first parallel shake correction amount from an angular velocity signal output from an angular velocity detection unit configured to detect shake and an acceleration signal output from an acceleration detection unit configured to detect shake;

computing a second parallel shake correction amount from the acceleration signal without using the angular velocity signal;

combining the first parallel shake correction amount and the second parallel shake correction amount to compute a third parallel shake correction amount; and correcting an image shake by a shake correction unit using the third parallel shake correction amount, wherein, when shake of the shake correction device is smaller than a predetermined value, setting in the combining step a weighted value of the second parallel shake correction amount to be higher than that when the shake is greater than the predetermined value.

15. A control method for a shake correction device, the method comprising:

computing a first parallel shake correction amount from an angular velocity signal output from an angular velocity detection unit configured to detect shake and an acceleration signal output from an acceleration detection unit configured to detect shake;

computing a second parallel shake correction amount from the acceleration signal without using the angular velocity signal;

combining the first parallel shake correction amount and the second parallel shake correction amount to compute a third parallel shake correction amount; and correcting an image shake by a shake correction unit using the third parallel shake correction amount, wherein, when shake of the shake correction device is greater than a predetermined value, setting in the combining step a weighted value of the first parallel shake correction amount to be higher than that when the shake is smaller than the predetermined value.

* * * * *